United States Patent Office 3,655,754
Patented Apr. 11, 1972

---

3,655,754
PROCESS FOR PREPARING NITRILO-TRIACETIC ACID TRIAMIDE
Joseph D. Moyer, Silver Spring, Md., assignor to W. R. Grace & Co., New York, N.Y.
No Drawing. Original application Sept. 20, 1967, Ser. No. 673,245, now Patent No. 3,558,630, dated Jan. 26, 1971. Divided and this application July 9, 1970, Ser. No. 53,662
Int. Cl. C07c *103/00*
U.S. Cl. 260—561 A         5 Claims

ABSTRACT OF THE DISCLOSURE

Nitrilotriacetic acid is reacted with an amide to form 3,5-dioxo-1-piperazineacetamide which is reacted with ammonia or ammonium hydroxide to form nitrilotriacetic acid triamide.

---

The present application is a division of application U.S. Ser. No. 673,245, filed Sept. 20, 1967, now U.S. Pat. No. 3,558,630.

The present invention relates to a novel and useful process for forming chemical compounds. More particularly, it relates to a process for the preparation of 3,5-dioxo-1-piperazineacetamide and nitrilotriacetic acid triamide.

It is known in the art that 3,5-dioxo-1-piperazineacetamide and nitrilotriacetic acid triamide can be prepared by first preparing the esters of nitrilotriacetic acid. (See J. V. Dubsky, "Berichte," vol. 49, p. 1041 (1916).) The process, however, involves solvents, intermediate separations and is quite time consuming to give low yields. Quite obviously, if a simple and inexpensive process could be developed for forming the nitrilotriacetic acid triamide and 3,5-dioxo-1-piperazineacetamide it would be a vast improvement over the prior art.

It is an object of the present invention to prepare 3,5-dioxo-1-piperazineacetamide in an easy and inexpensive manner. A further object is to prepare nitrilotriacetic acid triamide from 3,5-dioxo-1-piperazineacetamide. Other objects will become apparent as the description of the invention proceeds.

These objects are accomplished by the present invention which provides a process for the preparation of nitrilotriacetic acid triamide which comprises reacting nitrilotriacetic acid with an amide at a temperature of at least about 135° C. to form 3,5-dioxo-1-piperazineacetamide which is reacted with an agent selected from the group consisting of ammonia and ammonium hydroxide to form nitrilotriacetic acid triamide. The reaction proceeds as follows:

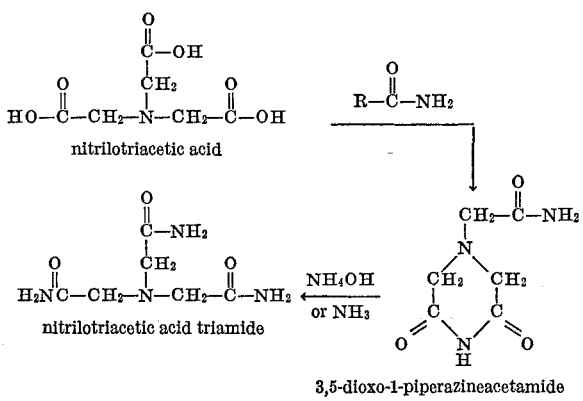

wherein R is an organic radical or hydrogen. In a preferred embodiment of the present invention, an aliphatic amide containing 1 to 8 carbon atoms is employed for the reaction and the nitrilotriacetic acid is soluble in the amide so that a solvent is not needed.

The present invention also provides a process for the preparation of 3,5-dioxo-1-piperazineacetamide which comprises reacting nitrilotriacetic acid with an amide at a temperature of at least about 135° C. to form 3,5-dioxo-1-piperazineacetamide. The reaction is generally carried out at a temperature of from about 150° C. to about 220° C. and, more preferably, from about 155° C. to about 180° C.

The present invention further provides a process for the preparation of nitrilotriacetic acid triamide which comprises reacting 3,5-dioxo-1-piperazineacetamide with an agent selected from the group consisting of ammonia and ammonium hydroxide to form nitrilotriacetic acid triamide. Preferably, ammonium hydroxide is used. Other materials which generate ammonia in situ may likewise be employed. The reaction is easily carried out at room temperature and elevated temperatures are not required although they may be used, if desired, to hasten the reaction. Very low temperatures may also be used as hereinafter demonstrated.

Among the various amides which may be used in the practice of the present invention are formamide, acetamide, propionamide, n-butyramide, n-valeramide, benzamide, stearamide, and the like. Other amides may also be used if desired. As previously pointed out, the preferred amides are aliphatic amides containing from 2–8 carbon atoms which are liquid at the reaction temperature and dissolve the nitrilotriacetic acid so no solvent is needed.

The reaction for forming the 3,5-dioxo-1-piperazineacetamide theoretically requires two moles of the amide for each mole of nitrilotriacetic acid but a surplus of the amide is generally employed to tend up drive the reaction to completion. In general, from about 3 to about 15 moles of the amide is used for each mole of the nitrilotriacetic acid.

The following examples are given to illustrate the invention and are not intended to limit it in any manner. All parts are given by weight unless otherwise expressed.

EXAMPLE 1

500 grams of nitrilotriacetic acid (2.62 moles) and 1500 ml. of formamide are heated in a 3 liter round bottomed flask with a heating mantle. The reactants are heated for a period of 2½ hours at a temperature ranging from 155° C. to 175° C. After cooling to 60° C., 1500 ml. of 2-propanol are added until the precipitate which forms is just dissolved. The brownish crystalline material that separates on cooling overnight is filtered and recrystallized by dissolution in a 1000 ml. of warm water (60° C.) and then 300 ml. of 2-propanol (i.e., just short of turbidity) is added. The crystalline product is separated by filtration and dried in a vacuum oven overnight at 60° C.

The yield is 144 g. (32%) and M.P. 216–218° C. An additional 63 g. (14%) is recovered from the supernatant solution by the evaporation of most of the formamide in vacuum and the addition of 2-propanol as before. Total recovery is 46%. Nuclear magnetic resonance spectroscopy establishes the compound as the 3,5-dioxo-1-piperazineacetamide.

10 grams of 3,5-dioxo-1-piperazineacetamide is dissolved in 100 ml. of concentrated NH$_4$OH (30%) at room temperature. On standing for 1 hour a crystalline precipitate forms which is filtered and dried in a vacuum oven at 60° C. The nitrilotriacetic acid triamide is a white crystalline solid which melts with decomposition at 206–209° C.

EXAMPLE 2

200 grams of nitrilotriacetic acid (1.05 moles) and 400 grams of acetamide are heated in a 1 liter round bottomed flask with a heating mantle. The reactants are heated for a period of 2 hours at a temperature of 200±5° C. After cooling to 80° C., 1 liter of 2-propanol is added. No precipitate forms in this case. The brownish crystalline material that separates on cooling overnight is filtered and recrystallized by dissolution in 400 ml. of warm water (80° C.) and filtered through decolorizing carbon.

The solution is placed in a refrigerator (05° C.) overnight and the crystals are filtered and dried in a vacuum oven overnight at 60° C.

The yield is 40 g. (24%). The residual material in the supernatant solution is not recovered. The 3,5-dioxo-1-piperazineacetamide is the same as in Example 1.

5 grams of (0.029 mole) of 3,5-dioxo-1-piperazineacetamide in a 100 ml. round bottomed flask is immersed in a Dry Ice-acetone bath. Excess anhydrous ammonia (50 ml.) is condensed in the flask from a cylinder, and is refluxed under a Dry Ice-cooled condenser for ½ hour, then allowed to evaporate. The residue is freed of adsorbed ammonia by warming to 60° in a vacuum oven for ½ hour. The yield of the triamide is quantitative and is identical to the triamide product of Example 1.

The nitrilotriacetic acid triamide prepared in accordance with the present invention is used as an anti-caking agent and anti-static agent. Other uses would be obvious to those skilled in the art.

Many equivalent modifications will be apparent to those skilled in the art from a reading of the foregoing without a departure from the inventive concept.

What is claimed is:

1. A process for the preparation of nitrilotriacetic acid triamide which comprises:

adding to a reaction vessel from about 3 to about 15 moles of an amide member selected from the group consisting of formamide, acetamide, propionamide, n-butyramide, n-valeramide, benzamide, and stearamide, per mole of nitrilotriacetic acid;

heating the contents of the reaction vessel to a temperature of at least about 135° C. to form 3,5-dioxo-1-piperazineacetamide;

isolating 3,5-dioxo-1-piperazineacetamide from the reaction vessel;

contacting said 3,5-dioxo-1-piperazineacetamide with a member selected from the group consisting of ammonia and ammonium hydroxide; and isolating nitrilotriacetic acid triamide.

2. The process of claim 1 wherein the nitrilotriacetic acid is reacted with the amide at a temperature of from about 150° C. to about 220° C.

3. The process of claim 1 wherein the nitrilotriacetic acid is reacted with the amide at a temperature of from about 155° C. to about 180° C.

4. A process for the preparation of nitrilotriacetic acid triamide which comprises reacting 3,5-dioxo-1-piperazineacetamide with an agent selected from the group consisting of ammonia and ammonium hydroxide to form nitrilotriacetic acid triamide.

5. The process of claim 4 wherein the agent is ammonium hydroxide.

References Cited
UNITED STATES PATENTS

| | | | |
|---|---|---|---|
| 2,480,439 | 8/1949 | Bersworth | 260—561 |
| 3,558,630 | 1/1971 | Moyer | 260—268 |

LEWIS GOTTS, Primary Examiner

E. G. LOVE, Assistant Examiner